(Model.)

E. HORTON.
CLOCK SPRING.

No. 243,901. Patented July 5, 1881.

Witnesses.

Everett Horton
Inventor
By Atty

UNITED STATES PATENT OFFICE.

EVERETT HORTON, OF NEW HAVEN, CONNECTICUT.

CLOCK-SPRING.

SPECIFICATION forming part of Letters Patent No. 243,901, dated July 5, 1881.

Application filed May 12, 1881. (Model.)

*To all whom it may concern:*

Be it known that I, EVERETT HORTON, of New Haven, in the county of New Haven and State of Connecticut, have invented a new Improvement in Clock-Springs; and I do hereby declare the following, when taken in connection with the accompanying drawings and the letters of reference marked thereon, to be a full, clear, and exact description of the same, and which said drawings constitute part of this specification, and represent, in—

Figure 1:
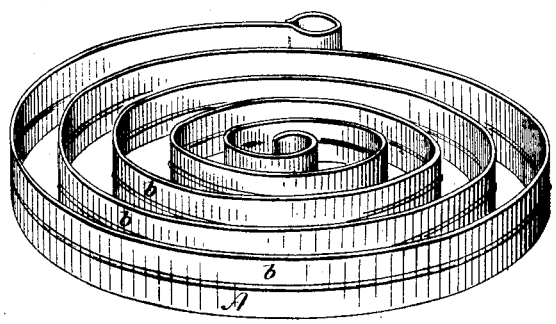
Figure 2:
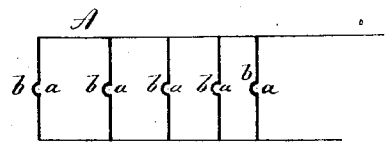

Figure 1, a perspective view; Fig. 2, a transverse section.

This invention relates to an improvement in that class of springs made from thin strips of steel coiled or wound into volute shape, and such as are used for clocks and similar purposes, the object being to stiffen the spring of a given thickness; and the invention consists in rolling the strip from which the spring is to be made with one or more longitudinal ribs on one side, produced by a corresponding depression on the other side, and so that in coiling or winding the spring the groove upon the one side will close upon the rib on the adjacent side, as more fully hereinafter described.

The strip A of steel from which the spring is to be made is passed between rollers, one of which has an annular rib and the other a corresponding groove, (one or more,) and so that as the strip is passed between the rolls a groove, *a*, will be impressed in the surface of the spring equal in width throughout its length, and a corresponding raised rib, *b*, on the opposite side, also of equal width throughout its length. Several such parallel grooves and ribs may be made. These grooves and ribs impart to the spring a greatly-increased strength, so that for a given power a very much lighter material can be used than when the spring is left plain and flat, as in the usual construction. Again, a spring thus strengthened is less liable to break than a plain flat spring, and costs little or nothing more to manufacture than the common flat spring. Another advantage of the spring is that in winding, the groove on one side engages with the rib of the next layer of the spring, and hence is not liable to slip off or work out of place.

I claim—

The herein-described spring for clocks and like purposes, consisting of a strip of steel with one or more longitudinal grooves on one side and corresponding rib or ribs on the opposite side, of equal width throughout their length, and so that the rib of one layer or coil will engage the groove of the next, substantially as described.

EVERETT HORTON.

Witnesses:
J. H. SHUMWAY,
L. D. ROGERS.